United States Patent [19]
Yokogawa et al.

[11] Patent Number: 5,830,387
[45] Date of Patent: Nov. 3, 1998

[54] PROCESS OF FORMING A HYDROPHOBIC AEROGEL

[75] Inventors: Hiroshi Yokogawa, Hirakata; Masaru Yokoyama, Yao; Koichi Takahama, Amagasaki; Yuriko Uegaki, Osaka, all of Japan

[73] Assignee: Matsushita Electric Works, Ltd., Kadoma, Japan

[21] Appl. No.: 916,973

[22] Filed: Aug. 12, 1992

[51] Int. Cl.$^6$ ...................................................... B01J 13/00
[52] U.S. Cl. .................... 252/315.2; 423/338; 252/315.6
[58] Field of Search ......................... 423/338; 252/315.6, 252/315.2; 561/12; 502/233

[56] References Cited

U.S. PATENT DOCUMENTS

| | | | |
|---|---|---|---|
| 3,873,337 | 3/1975 | Läufer et al. | 106/483 |
| 4,610,863 | 9/1986 | Tewari et al. | 423/338 |
| 4,619,908 | 10/1986 | Cheng et al. | 502/214 |
| 4,776,867 | 10/1988 | Onorato et al. | 65/18.1 |
| 4,842,837 | 6/1989 | Shimizu et al. | 423/335 |
| 4,849,378 | 7/1989 | Hench et al. | 501/12 |
| 4,894,357 | 1/1990 | Hupe et al. | 562/233 |
| 4,911,903 | 3/1990 | Unger et al. | 423/335 |
| 4,943,542 | 7/1990 | Hayashi et al. | 501/12 |
| 4,954,327 | 9/1990 | Blount . | |
| 4,983,369 | 1/1991 | Barder et al. | 423/338 |
| 5,076,980 | 12/1991 | Nogues et al. | 364/65 |
| 5,227,239 | 7/1993 | Upadhye et al. | 420/402 |

FOREIGN PATENT DOCUMENTS

| | | | |
|---|---|---|---|
| 3882310 | 8/1990 | European Pat. Off. | 423/338 |

OTHER PUBLICATIONS

Tillotson et al., "Partially Hydrolyzed Alkoxysillanes As Precursors For Silica Aerogels", M.R.S. Symposium Proceedings, vol. 121 (1988) pp. 685–689.

Hrubesh et al., "Developmount of Low Density Silica Aerogel as a Capture Medium For Hyper–Velocity Particles", Report for FY 1989 To Nasa Jet Propulsion Laboratory, Oct. 1989.

*Primary Examiner*—Michael Lewis
*Assistant Examiner*—Stuart L. Hendrickson
*Attorney, Agent, or Firm*—Armstrong, Westerman, Hattori, McLeland & Naughton

[57] ABSTRACT

A hydrophobic aerogel is fabricated by reacting a polymer having a skeleton structure of $(SiO_2)_n$ with a hydrophobic agent having hydrophobic groups as well as functional groups reactive to silanol groups to obtain a denatured polymer, forming a gel consisting of two phase of a dispersing medium and the denatured polymer which was performed a hydrophobic treatment, and then, supercritically drying the gel at temperature and pressure above a critical point of the dispersing medium. The hydrophobic aerogel has improved characteristics free from deterioration in light transmissivity as well as lowered thermal resistance and also free from a dimensional variation such as shrinkage which would otherwise occur by contact with moisture, so that it can maintain the excellent characteristics for long time periods. Particularly, the aerogel is useful as a material having excellent light transmissivity and thermal resistance.

19 Claims, 1 Drawing Sheet

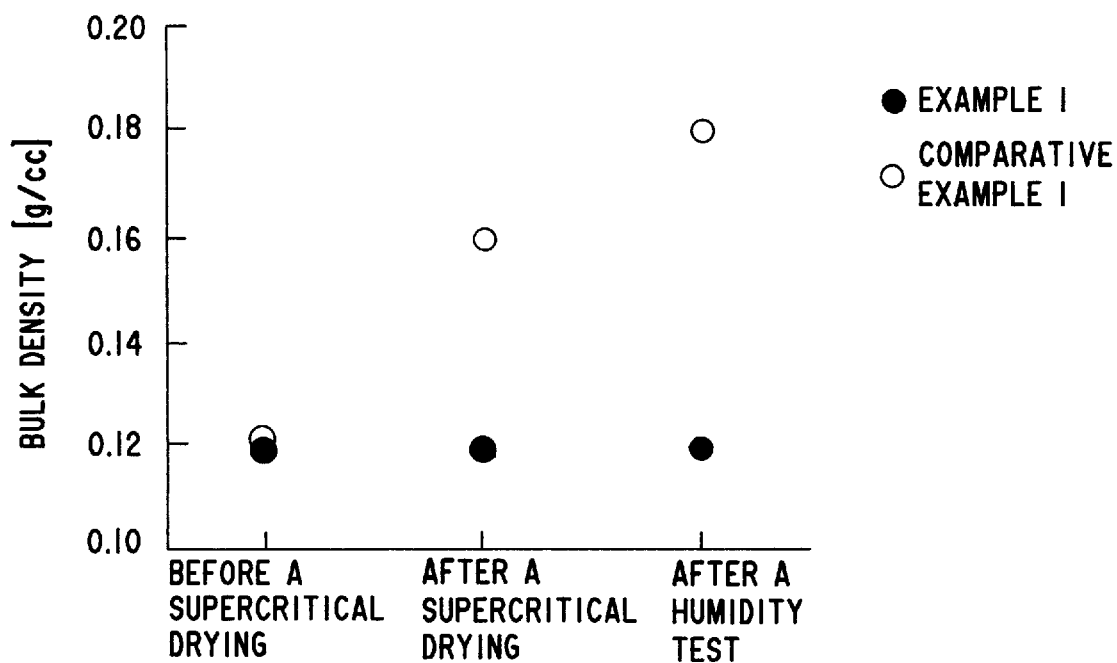
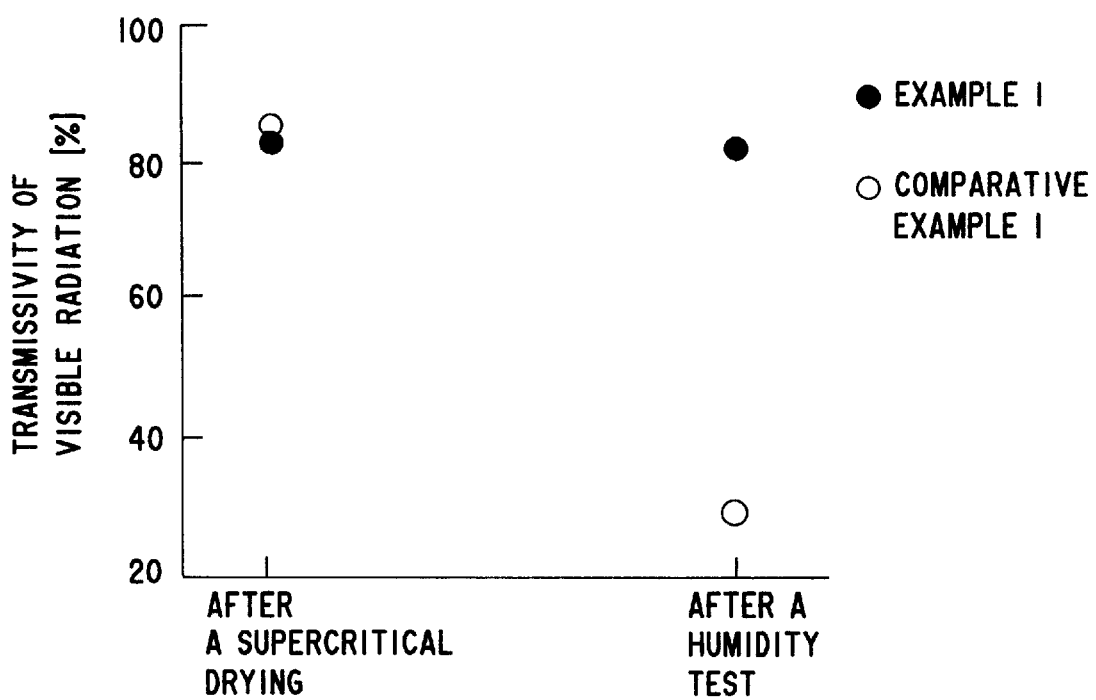

PROCESS OF FORMING A HYDROPHOBIC AEROGEL

TECHNICAL FIELD

The present invention relates to a process of forming a hydrophobic aerogel with excellent transparency and high thermal resistance.

BACKGROUND ART

Silica aerogel is already known as a material having excellent transparency and low thermal conductivity. As described in U.S. Pat. No. 4,402,927, No. 4,432,956 and No. 4,610,863, the aerogel is obtained by the step comprising, hydrolyzing and condensing an alkoxysilane in order to form a polymer having a skeleton structure of $(SiO_2)_n$ and silanol groups, supercritically drying the polymer in the presence of a dispersing medium such as carbon dioxide at temperature and pressure above a critical point of the dispersing medium. The patents also describe that thus obtained aerogel is useful as a material having excellent transparency and high thermal resistance. By the way, the skeleton structure of the aerogel includes the silanol groups by a certain rate. The silanol groups having high hydrophilicity which is formed by contact with moisture in the atmosphere increase at the surface of the aerogel. Therefore, the moisture adsorbing in the surface of the aerogel increases as the hours passed, so that optical and thermal properties of the aerogel such as transparency and thermal resistance will deteriorate, and also, a dimensional variation and cracks of the aerogel will result from shrinkage which is induced by the adsorption of the moisture. That is to say, there are problems to be improved about a quality and performance of the aerogel.

DISCLOSURE OF INVENTION

It is a primary object of the present invention to provide an improved process for forming a hydrophobic aerogel of silica which has stable transparency and thermal resistance even if the hours passed. It is a further object of the present invention to provide a preferred process for forming the hydrophobic aerogel which may be particularly useful to attain the primary object in industrial field. The primary object is attained by utilizing a gel including a dispersing medium and a polymer [silicate compound] having a skeleton structure of $(SiO_2)_n$ and silanol groups, and supercritically drying thereof. Concretely, it is attained by utilizing a denatured polymer which is obtained by reacting the polymer having a skeleton structure $(SiO_2)_n$ and silanol groups with a hydrophobic agent having a hydrophobic groups as well as a functional groups reactive to the silanol groups. That is to say, the improved process of the present invention comprises the steps of reacting the polymer having a skeleton structure $(SiO_2)_n$ and silanol groups with a hydrophobic agent having a hydrophobic groups as well as a functional groups reactive to the silanol groups to obtain a denatured polymer, dispersing the denatured polymer in the dispersing medium to form a resulting gel, and supercritically drying the resulting gel at temperature and pressure above a critical point of the dispersing medium. A detailed explanation of the present invention is described below. The polymer comprises the skeleton structure having at least $(SiO_2)_n$ and the silanol groups, and also may partially include a silicate compound having a chemical bond expressed by the following formula; Si—$R^1$ wherein n is a positive number, and $R^1$ is a $C_1$–$C_5$ alkyl group or a phenyl group. Silicon of the polymer adsorbs moisture in the atmosphere, so that it has tendency to stabilize as the silanol group. The polymer having the skeleton structure of $(SiO_2)_n$ as described above is obtained by hydrolyzing and condensing an alkoxysilane which is expressed by the following formula;

$$SiR^1{}_n(OR^2)_{4-n} \qquad (1)$$

wherein each of $R^1$ and $R^2$ stands for a $C_1$–$C_5$ alkyl group or phenyl group, n is 0–2, $R^1$ may be the same or different groups of the groups when n=2, $R^2$ may be the same or different ones of the groups when n<2. When concretely illustrating the alkoxysilane, the followings are acceptable. That is, an alkoxysilane having two functional groups is expressed by the following formula;

$$\begin{array}{c} R^3 \\ | \\ R^4{-}Si(OR^5)_2 \end{array} \qquad (2)$$

wherein each of $R^3$, $R^4$ and $R^5$ stands for the $C_1$–$C_5$ alkyl group or the phenyl group, two $R^5$ are selected as the same or different groups of the groups. And also, an alkoxysilane having three functional groups is expressed by the following formula;

$$R^6{-}Si(OR^7)_3 \qquad (3)$$

wherein each of $R^6$ and $R^7$ stands for the $C_1$–$C_5$ alkyl group or the phenyl group, three $R^7$ are selected from any combination of the groups. And further, an alkoxysilane having four functional groups is expressed by the following formula;

$$Si(OR^8)_4 \qquad (4)$$

wherein $R^8$ stands for the $C_1$–$C_5$ alkyl group or the phenyl group, four $R^8$ are selected from any combination of the groups. At least one selected from the group of the alkoxysilane expressed by the formula (3) or (4), or a mixture of the alkoxysilane expressed by the formula (2) and at least one selected from the group of the alkoxysilane expressed by the formula (3) or (4) are also acceptable for the present invention. That is to say, the alkoxysilane having two functional groups such as dimethyldimethoxysilane, dimethyldiethoxysilane, diphenyldiethoxysilane, diphenyldimethoxysilane, methylphenyldiethoxysilane, methylphenyldimethoxysilane, diethyldiethoxysilane, and diethyldimethoxysilane, etc., is acceptable for the present invention. The alkoxysilane having three functional groups such as methyltrimethoxysilane, methyltriethoxysilane, ethyltrimethoxysilane, ethyltriethoxysilane, phenyltrimethoxysilane, and phenyltriethoxysilane, etc., is acceptable for the present invention. The alkoxysilane having four functional groups such as tetramethoxysilane, and tetraethoxysilane, etc., is also acceptable for the present invention. An addition of a catalyst to a reaction system including the alkoxysilane described above is effective to hydrolyze the alkoxysilane in order to generate a silicon hydroxide, and then to condense the silicon hydroxide. The catalyst is selected from the group consisting of an acid catalyst such as hydrochloric acid, citric acid, nitric acid sulfuric acid, and ammonium fluoride, etc., and a base catalyst such as ammonia and pyrazine, etc. When the reaction system includes a mixed solution of water and a first solvent which is capable of dissolving the alkoxysilane and forming aqueous solution, the condensation of the silicon hydroxide can be performed continuously after the hydrolysis of the alkoxysilane has been completed. The first solvent is selected from the group consisting of methyl alcohol, ethyl alcohol, isopropyl alcohol, acetone and N, N-dimethylformamide, etc. Thus obtained polymer is a gel including the first solvent as the dispersing medium. When a starting material is the polymer [gel] by hydrolyzing and condensing the alkoxysilane as described above, a reaction for generating a denatured polymer is efficiently performed by washing the obtained polymer with the first solvent to remove the water in the obtained polymer. The reaction for generating the denatured polymer is explained below. That is, the denatured polymer which was replaced hydroxyl groups in the silanol groups with the hydrophobic groups is obtained by reacting the polymer having a skeleton structure of $(SiO_2)_n$ with the hydrophobic agent having the hydrophobic groups as well as the functional groups reactive to the silanol groups. Therefore, to replace the hydroxyl groups in the silanol groups with the hydrophobic groups, it prefers that the hydrophobic agent is added to the polymer by a sufficient rate relative to the silanol groups existing in the surface of the polymer, i.e., it prefers that a weight ratio of the polymer to the hydrophobic agent is 0.5 to 10. The functional group of the hydrophobic agent is selected from the group consisting of halogen, amino group, imino group, carboxyl group, and alkoxyl group. On the other hand, the hydrophobic group of the hydrophobic agent is selected from the group consisting of alkyl group, phenyl group and fluoride thereof. Therefore, the hydrophobic agent is at least one selected from the group consisting of an organic silane compound such as hexamethyldisilazane, hexamethyldisiloxane, trimethylchlorosilane, trimethylmethoxysilane, trimethylethoxysilane, triethylethoxysilane, triethylmethoxysilane, dimethyldichlorosilane, dimethyldiethoxysilane, methyltrichlorosilane, and ethyltrichlorosilane, etc. The hydrophobic agent is also selected from the group consisting of a carboxylic acid such as acetic acid, formic acid and succinic acid, etc., and a halogenated alkyl such as methylchloride, etc. A hydrophobic treatment, which is a reaction of the polymer [gel] and the hydrophobic agent described above, is performed by soaking the obtained polymer in a solution of a hydrophobic agent in a second solvent, and mixing the obtained polymer with the solution so as to diffuse each other, and then heating thereof. The second solvent such as ethyl alcohol, methyl alcohol, toluene, benzene, and N, N-dimethylformamide, etc., is utilized in the hydrophobic treatment. It prefers that the second solvent has capable of easily dissolving the hydrophobic agent therein, and replacing with the first solvent in the obtained polymer. It also prefers that the second solvent is a third solvent which is utilized in the step of supercritical drying, or the second solvent is easily replaced with the third solvent. Thus obtained gel by the above described steps essentially consists of the denatured polymer and the dispersing medium. The dispersing medium is defined by the first solvent used for generating the polymer, or the second solvent used in the hydrophobic treatment, or the third solvent utilized in the step of supercritical drying. In the specification of the present invention, "the dispersing medium" as used herein is meant to be a liquid component included in the gel, and "solvent" is used as an equally generic synonym. After the hydrophobic treatment, the gel is supercritically dried at temperature and pressure above a critical point of the third solvent in order to form the hydrophobic aerogel. The third solvent is at least one selected from the group consisting of methyl alcohol, ethyl alcohol, isopropyl alcohol, dichlorofluoromethane, liquefied carbon dioxide and water, etc. The supercritical drying is performed in, for example, an autoclave by increasing temperature and pressure above the critical point of the third solvent, and then, slowly removing the third solvent from the gel, so as to give the hydrophobic aerogel. The hydrophobic aerogel of the present invention has a porous structure consisting of exceedingly fine particles of silica. As a particle size of the silica and a distance between the adjacent particles are much shorter than a wave length of light, the hydrophobic aerogel has excellent transparency of light irrespective of the porous structure with low thermal conductivity. And besides, as the hydroxyl groups in the silanol groups, which exists in the surface of the polymer having the skeleton structure of $(SiO_2)_n$ before supercritically drying, is replaced with the hydrophobic groups of the hydrophobic agent, the hydrophobic aerogel of the present invention will not adsorb moisture in the atmosphere, so that it provides excellent transparency and thermal resistance even after using it for long time periods. The supercritical drying of the present invention is very useful to remove the dispersing medium from the gel so as to form the hydrophobic aerogel while maintaining the porous structure without occurring only a small structure change which is induced by hydrogen bond between the silanol groups. Particularly, as the dispersing medium is removed from the gel so as to maintain the porous structure, the hydrophobic aerogel having a desired bulk density or pore size is readily fabricated by the improved process of the present invention, so that it enhances an industrial value of the aerogel.

BRIEF DESCRIPTION OF DRAWINGS

FIG. 1 is a diagram showing bulk densities of aerogel measured before and after supercritically drying and those of the aerogel after being subjected to a humidity test with respect to example 1 of the present invention in comparison with comparative example 1;

FIG. 2 is a diagram showing light transmissivities of the aerogel measured before and after supercritically drying and those of the aerogel after being subjected to the humidity test with respect to example 1 of the present invention in comparison with comparative example 1.

BEST MODE FOR CARRYING OUT THE INVENTION

Examples 1–10 of the present invention and comparative examples 1–5 are described below. However, the present invention is not limited by the examples.

EXAMPLE 1

A mixed solution of aqueous ammonia of 0.01 mol/l and ethyl alcohol was slowly added in tetramethoxysilane which is an alkoxysilane having four functional groups. A mixture ratio of tetramethoxysilane:ethyl alcohol:ammonia was 1:5:4 by the molar ratio. Thus obtained mixture was hydrolyzed at 20° C. while agitating it for 1 hour, and subsequently, gelled in a vessel having a diameter of 51 mm. Condensation of thus obtained gel was expedited by heating to a temperature of 50° C. while adding ethyl alcohol repeatedly so as not to dry the gel, thereby forming a gelled polymer [alcogel] having a skeleton structure of $(SiO_2)_n$. The gelled polymer had a thickness of 5 mm, a diameter of 51 mm. For performing a hydrophobic treatment of the gelled polymer [alcogel], toluene solution was prepared by dissolving hexamethyldisilazane in toluene by a ratio of 0.2 mol/l, and the gelled polymer was put in the toluene solution which has five times volume compared with the polymer, and then, the hexamethyldisilazane was infiltrated into the polymer by spending 24 hours. Subsequently, thus obtained polymer was refluxed with stirring while being heated to a temperature of 110° C. for about 2 hours, so that a denatured polymer which is also a hydrophobic polymer was obtained. And then, the denatured polymer [gel] was put in ethyl alcohol. A solvent included in the denatured polymer was replaced with the ethyl alcohol repeatedly by spending 24 hours, that is, non-reacted hexamethyldisilazane and toluene in the denatured polymer were replaced with the ethyl alcohol. And besides, the alcogel was put in liquefied carbon dioxide at a temperature of 18° C. under a pressure of 55 atm for 3 hours in order to replace the ethyl alcohol included in the alcogel with the carbon dioxide, and subsequently was placed in an autoclave. The autoclave was filled with a dispersing medium consisting of a mixture of ethyl alcohol and carbon dioxide. A supercritical drying was performed in the autoclave for about 48 hours under a supercritical condition such as a temperature of 80° C. and a pressure of 160 atm., so that an aerogel which has an extremely fine porous structure and excellent transparency and low bulk density was formed.

EXAMPLE 2

Example 2 was identical in process for forming the aerogel to the example 1 except that trimethylchlorosilane as a hydrophobic agent was utilized in stead of hexamethyldisilazane.

EXAMPLE 3

The denatured polymer [gel] obtained by the same process of the example 1 was put in ethyl alcohol. And then, the solvent included in the denatured polymer was replaced with the ethyl alcohol repeatedly by spending 24 hours, that is, the non-reacted hexamethyldisilazane and toluene in the denatured polymer were replaced with the ethyl alcohol. Thus obtained gel [alcogel] was placed in the autoclave. And then, the autoclave was filled with ethyl alcohol as the dispersing medium. Subsequently, the supercritical drying was performed in the autoclave for about 6 hours under a supercritical condition such as a temperature of 250° C. and a pressure of 80 atm., so that an aerogel was formed.

EXAMPLE 4

The mixed solution of aqueous ammonia of 0.01 mol/l and ethyl alcohol was slowly added in tetraethoxysilane. A mixture ratio of tetraethoxysilane:ethyl alcohol:water was 1:5.5:5 by the molar ratio. Thus obtained mixture was hydrolyzed at 20° C. while agitating for 1 hour, and subsequently, gelled in the same vessel of the example 1. The condensation of thus obtained gel was expedited by heating to a temperature of 50° C. while adding ethyl alcohol repeatedly so as not to dry the gel, thereby forming a gelled polymer [alcogel] having a skeleton structure of $(SiO_2)_n$. Subsequently, the same process of the example 1 was given to thus obtained polymer [alcogel] in order to form an aerogel.

EXAMPLE 5

A mixed solution of aqueous solution of ammonium fluoride of 0.04 mol/l and ethyl alcohol was slowly added in tetraethoxysilane. A mixture ratio of tetraethoxysilane:ethyl alcohol:water was 1:5.5:5 by the molar ratio.

Thus obtained mixture was hydrolyzed at 20° C. while agitating for 1 hour, and subsequently, gelled in the same vessel of the example 1. The condensation of thus obtained gel was expedited by heating to a temperature of 50° C. while adding ethyl alcohol repeatedly so as not to dry the gel, thereby forming a gelled polymer [alcogel] having a skeleton structure of $(SiO_2)_n$. Subsequently, the same process of the example 1 was given to thus obtained polymer [alcogel] in order to form an aerogel.

EXAMPLE 6

The denatured polymer [gel] formed by the same process of the example 1 and performed the hydrophobic treatment was put in ethyl alcohol. And then, the solvent included in the denatured polymer was replaced with the ethyl alcohol repeatedly by spending 24 hours, that is, the non-reacted hexamethyldisilazane and toluene in the denatured polymer were replaced with the ethyl alcohol, thereby forming alcogel. And besides, the alcogel was put in carbon dioxide at a temperature of 18° C. under a pressure of 55 atm, so that the ethyl alcohol in the alcogel was replaced with the carbon dioxide. Thus obtained alcogel was placed in the autoclave. And then, the autoclave was filled with carbon dioxide. Subsequently, the supercritical drying was performed in the autoclave for about 24 hours under a supercritical condition such as a temperature of 40° C. and a pressure of 80 atm., so that an aerogel was formed.

EXAMPLE 7

The mixed solution of aqueous ammonia of 0.01 mol/l and ethyl alcohol was slowly added in a mixture of dimethyldimethoxysilane, which is an alkoxysilane having two functional group, and tetramethoxysilane having four functional group. A mixture ratio of dimethyldimethoxysilane:tetramethoxysilane was 1:9 by the molar ratio. On the other hand, a mixture ratio of tetramethoxysilane:ethyl alcohol:water was 1:5:4 by the molar ratio. Thus obtained mixture was hydrolyzed at 20° C. while agitating for 1 hour, and subsequently, gelled in the same vessel of the example 1. The condensation of thus obtained gel was expedited by heating to a temperature of 50° C. while adding ethyl alcohol repeatedly so as not to dry the gel, thereby forming a gelled polymer [alcogel] having a skeleton structure of $(SiO_2)_n$. Subsequently, the same process of the example 1 was given to thus obtained polymer [alcogel] in order to form an aerogel.

EXAMPLE 8

The mixed solution of aqueous ammonia of 0.01 mol/l and ethyl alcohol was slowly added in a mixture of methyltrimethoxysilane, which is an alkoxysilane having three functional group, and tetramethoxysilane having four functional group. A mixture ratio of methyltrimethoxysilane:tetramethoxysilane is 5:5 by the molar ratio. On the other hand, a mixture ratio of tetramethoxysilane:ethyl alcohol:water was 1:5:4 by the molar ratio. Thus obtained mixture was hydrolyzed at 20° C. while agitating for 1 hour, and subsequently, gelled in the same vessel of the example 1. The condensation of thus obtained gel was expedited by heating to a temperature of 50° C. while adding ethyl alcohol repeatedly so as not to dry the gel, thereby forming a gelled polymer [alcogel] having a skeleton structure of $(SiO_2)_n$. Subsequently, the same process of the example 1 was given to thus obtained polymer [alcogel] in order to form an aerogel.

EXAMPLE 9

The gelled polymer having the skeleton structure of $(SiO_2)_n$, which was formed by the same process of the example 1, was put in a toluene solution including acetic anhydride as the hydrophobic agent and pyrazine of 10 cc as a catalyst. The acetic anhydride was infiltrated into the polymer by spending 24 hours. Subsequently, thus obtained polymer was refluxed with stirring while being heated to a temperature of 110° C. for about 2 hours, so that a denatured polymer [gel] which is also a hydrophobic polymer in a humid state was obtained. Subsequently, the same process of the example 1 was given to the denatured polymer [gel] in order to form an aerogel.

EXAMPLE 10

The gelled polymer having the skeleton structure of $(SiO_2)_n$ was formed by the same process of the example 1. The gelled polymer was put in ethyl alcohol solution of hexamethyldisilazane in ethyl alcohol by a ratio of 0.2 mol/l, which has five times volume compared with the polymer. And then, the hexamethyldisilazane was infiltrated into the polymer by spending 24 hours. Subsequently, thus obtained polymer was refluxed with stirring while being heated to a temperature of 70° C. for about 2 hours, so that a denatured polymer [alcogel] which is also a hydrophobic polymer in a humid state was obtained. Subsequently, the same process of the example 1 was given to the denatured polymer [alcogel] in order to form an aerogel.

COMPARATIVE EXAMPLE 1

The gelled polymer having the skeleton structure of $(SiO_2)_n$, which was formed by the same process of the example 1, was put in ethyl alcohol without reacting with the hydrophobic agent. And then, a solvent included in the gelled polymer was replaced with the ethyl alcohol repeatedly by spending 24 hours. Thus obtained alcogel was put in carbon dioxide at a temperature of 18° C. under a pressure of 55 atm for 3 hours so as to replace the ethyl alcohol included in the alcogel with the carbon dioxide. Subsequently, thus obtained polymer was placed in the autoclave. And then, the autoclave was filled with the dispersing medium consisting of the mixture of ethyl alcohol and carbon dioxide. The supercritical drying is performed in the autoclave for about 48 hours under the supercritical condition such as a temperature of 80° C. and a pressure of 160 atm, so that thus obtained aerogel has an extremely fine porous structure and excellent transparency and low bulk density but having small size compared with the aerogel of the example 1.

COMPARATIVE EXAMPLE 2

The gelled polymer having the skeleton structure of $(SiO_2)_n$, which was formed by the same process of the example 3, was put in ethyl alcohol without reacting with the hydrophobic agent. And then, a solvent included in the gelled polymer was replaced with the ethyl alcohol repeatedly by spending 24 hours. Subsequently, thus obtained polymer was placed in the autoclave. The autoclave was filled with ethyl alcohol as the dispersing medium. And then, the supercritical drying is performed in the autoclave for about 6 hours under the supercritical condition such as a temperature of 250° C. and a pressure of 80 atm, so that an aerogel was obtained.

COMPARATIVE EXAMPLE 3

The gelled polymer having the skeleton structure of $(SiO_2)_n$, which was formed by the same process of the example 4, was put in ethyl alcohol without reacting with the hydrophobic agent. And then, a solvent included in the gelled polymer was replaced with the ethyl alcohol repeatedly by spending 24 hours. Subsequently, the same supercritical drying of the example 4 is performed in order to form an aerogel.

COMPARATIVE EXAMPLE 4

The gelled polymer having the skeleton structure of $(SiO_2)_n$, which was formed by the same process of the example 1, was dried in the atmosphere for one week at a temperature of 20° C. under an atmospheric pressure without reacting with the hydrophobic agent, so that a xerogel having coarse porous structure was formed.

COMPARATIVE EXAMPLE 5

The denatured polymer, which was formed by the same process of the example 1 and performed the hydrophobic treatment, was dried in the atmosphere for one week at a temperature of 20° C. under an atmospheric pressure, so that a xerogel having coarse porous structure was formed.

TABLE 2 shows bulk densities, thermal conductivities, light transmissivities and specific surfaces of the aerogel and the xerogel measured immediately after a supercritical drying and after a humidity test with respect to the examples 1–9 and the comparative examples 1–5. TABLE 1 also shows starting materials, catalysts, hydrophobic agents, dispersing mediums and conditions for supercritical drying, respectively, utilized in the examples 1–10 and the comparative examples 1–5. The specific surfaces were measured by the nitrogen-absorption BET method, while thermal conductivities were measured in accordance with ASTM C-518 by the use of a thermal conductivity measuring device in a steady-state process at temperatures of 20° C. and 40° C. The light transmissivities were determined by a method based on JIS-R3106 which comprises the step of measuring spectral distribution of visible radiation. The humidity test was performed for 48 hours at a temperature of 60° C. in a isothermal humidistat held at a relative humidity of 90%. As shown in TABLE 2, the aerogel of the examples 1–10 have lower bulk densities than the xerogel of the comparative examples 1–5. It is considered that the gel with the hydrophobic treatment did not occurred a shrinkage when supercritically drying the gel, on the other hand, the gel without the hydrophobic treatment [COMPARATIVE EXAMPLE 1–3] occurred a small shrinkage when supercritically drying, and also, a large shrinkage was occurred by usual drying the gel irrespective of the presence of the hydrophobic treatment. FIGS. 1 and 2 are diagrams showing bulk densities and light transmissivities of the aerogel, respectively, which were measured before and after supercritically drying and also after the humidity test, with respect to the example 1 of the present invention and the comparative example 1. The bulk densities of the gel before supercritically drying was determined by dividing weight of solid phase of the gel by total volume of the gel. As shown in FIGS. 1 and 2, the aerogel formed by supercritically drying the gel with the hydrophobic treatment maintains excellent performance for longer time periods compared with the aerogel without the hydrophobic treatment, that is, it is confirmed that the hydrophobic aerogel of the present invention has excellent water proof so as not to deteriorate the performance even if the aerogel contacts to water.

INDUSTRIAL APPLICABILITY

A hydrophobic aerogel fabricated in accordance with the present invention has improved characteristics free from deterioration in light transmissivity as well as lowered thermal resistance which would otherwise occur by contact with moisture over an extended time period. The aerogel is particularly useful for a heat insulator and an acoustic material and is provided with a variety of configuration such as plate, powder, etc. And besides, the aerogel is possible to utilize in Cerenkov counter.

reacting a polymer having a skeleton structure of $-(SiO_2)-$ with a hydrophobic agent having hydrophobic groups as well as functional groups reactive with silanol groups to obtain a hydrophobic polymer;

dispersing said hydrophobic polymer in a dispersing medium to form a resulting gel; and

TABLE 1

| | Starting material Alkoxysilane | Catalyst | Hydrophobic agent | dispersing medium | Condition of a supercritical drying |
|---|---|---|---|---|---|
| Example 1 | tetramethoxysilane | ammonia | hexamethyl-disilazane | ethanol/$CO_2$ | 80° C., 160 atm, 48 hours |
| Example 2 | tetramethoxysilane | ammonia | trimethyl-chrolosilane | ethanol/$CO_2$ | 80° C., 1 60 atm, 48 hours |
| Example 3 | tetramethoxysilane | ammonia | hexamethyl-disilazane | ethanol | 250° C., 80 atm, 24 hours |
| Example 4 | tetraethoxysilane | ammonia | hexamethyl-disilazane | ethanol/$CO_2$ | 80° C., 160 atm, 48 hours |
| Example 5 | tetraethoxysilane | ammonium fluoride | hexamethyl-disilazane | ethanol/$CO_2$ | 80° C., 160 atm, 48 hours |
| Example 6 | tetramethoxysilane | ammonia | hexamethyl-disilazane | $CO_2$ | 40° C., 80 atm, 24 hours |
| Example 7 | dimethyldimethoxysilane, 1/10 tetramethoxysilane, 9/10 | ammonia | hexamethyl-disilazane | ethanol/$CO_2$ | 80° C., 160 atm, 48 hours |
| Example 8 | methyltrimethoxysilane, 5/10 tetramethoxysilane, 5/10 | ammonia | hexamethyl-disilazane | ethanol/$CO_2$ | 80° C., 160 atm, 48 hours |
| Example 9 | tetramethoxysilane | ammonia | acetic anhydride | ethanol/$CO_2$ | 80° C., 160 atm, 48 hours |
| Example 10 | tetramethoxysilane | ammonia | hexamethyl-disilazane *1 | ethanol/$CO_2$ | 80° C., 160 atm, 48 hours |
| Comparative Example 1 | tetramethoxysilane | ammonia | — | ethanol/$CO_2$ | 80° C., 160 atm, 48 hours |
| Comparative Example 2 | tetramethoxysilane | ammonia | — | ethanol | 250° C., 80 atm, 24 hours |
| Comparative Example 3 | tetramethoxysilane | ammonia | — | ethanol/$CO_2$ | 80° C., 160 atm, 48 hours |
| Comparative Example 4 | tetramethoxysilane | ammonia | — | ethanol | 20° C., 1 atm, 1 week |
| Comparative Example 5 | tetramethoxysilane | ammonia | hexamethyl-disilazane | ethanol | 20° C., 1 atm, 1 week |

*1: Treatment solvent is ethanol.

TABLE 2

| | Specific surface: ($m^2$/g) | Bulk density: (g/$cm^3$) | | Thermal conductivity: (Kcal)/mh° C. | | Transmissivity of visible radiation: (%) | |
|---|---|---|---|---|---|---|---|
| | | After a super-critical drying | After a humidity test | After a super-critical drying | After a humidity test | After a super-critical drying | After a humidity test |
| Example 1 | 821 | 0.12 | 0.12 | 0.012 | 0.012 | 83.5 | 83.3 |
| Example 2 | 813 | 0.12 | 0.12 | 0.011 | 0.012 | 83.9 | 83.2 |
| Example 3 | 781 | 0.13 | 0.13 | 0.014 | 0.016 | 79.2 | 78.8 |
| Example 4 | 850 | 0.11 | 0.11 | 0.014 | 0.017 | 81.5 | 80.9 |
| Example 5 | 800 | 0.12 | 0.12 | 0.012 | 0.014 | 78.5 | 77.9 |
| Example 6 | 806 | 0.12 | 0.12 | 0.013 | 0.014 | 84.9 | 81.3 |
| Example 7 | 758 | 0.13 | 0.13 | 0.014 | 0.014 | 77.1 | 76.3 |
| Example 8 | 720 | 0.12 | 0.12 | 0.013 | 0.014 | 73.5 | 73.0 |
| Example 9 | 821 | 0.11 | 0.11 | 0.012 | 0.013 | 78.9 | 78.8 |
| Example 10 | 809 | 0.12 | 0.12 | 0.012 | 0.012 | 81.5 | 81.0 |
| Comparative Example 1 | 802 | 0.16 | 0.18 | 0.014 | 0.052 | 86.3 | 29.8 |
| Comparative Example 2 | 855 | 0.15 | 0.17 | 0.014 | 0.061 | 84.5 | 35.0 |
| Comparative Example 3 | 840 | 0.16 | 0.19 | 0.014 | 0.070 | 81.3 | 32.4 |
| Comparative Example 4 | 520 | 0.60 | 0.69 | 0.15 | 0.19 | 88.5 | 62.3 |
| Comparative Example 5 | 489 | 0.65 | 0.65 | 0.16 | 0.16 | 86.9 | 85.5 |

We claim:

1. A process of forming a hydrophobic aerogel comprising the steps of:

supercritically drying said resulting gel at a temperature and pressure above a critical point of said dispersing medium to obtain a hydrophobic aerogel which has a porous structure.

2. A process as set forth in claim 1, wherein said polymer has said silanol groups reacting with the functional groups of said hydrophobic agent.

3. A process as set forth in claim 1, wherein said functional group is selected from the group consisting of halogen, amino group, imino group, carboxyl group, and alkoxyl group.

4. A process as set forth in claim 1, wherein said hydrophobic group is selected from the group consisting of alkyl group and phenyl group.

5. A process as set forth in claim 1, wherein said hydrophobic agent is a silane compound.

6. A process as set forth in claim 1, said polymer is provided by hydrolyzing and condensing an alkoxysilane which is expressed by the following formula;

$$SiR^1_n(OR^2)_{4-n}$$

wherein each of $R^1$ and $R^2$ stands for a $C_1$–$C_5$ alkyl group or a phenyl group, n is 0–2.

7. A process as set forth in claim 6, wherein said hydrolyzing and condensing is effected by the use of an aqueous solution of a solvent capable of being compatible with water and dissolving said alkoxysilane.

8. A process as set forth in claim 7, wherein said solvent is selected form the group consisting of methyl alcohol, ethyl alcohol, isopropyl alcohol, acetone and N,N-dimethylformamide.

9. A process as set forth in claim 7, wherein the solvent of claim 7 is used as said dispersing medium.

10. A process as set forth in claim 7, wherein said dispersing medium is a compound having a critical point less than that of said solvent.

11. A process as set forth in claim 10, wherein said compound having the low critical point is carbon dioxide.

12. A process as set forth in claim 1, wherein said hydrophobic agent is at least one silane compound selected from the group consisting of hexamethyldisilazane, hexamethyldisiloxane, trimethylchlorosilane, trimethylmethoxysilane, trimethylethoxysilane, triethylethoxysilane, triethylmethoxysilane, dimethyldichlorosilane, dimethyldiethoxysilane, methyltrichlorosilane and ethyltrichlorosilane.

13. A process of forming a hydrophobic aerogel comprising the steps of:

reacting a polymer having a skeleton structure of $-(SiO_2)-$ with a hydrophobic agent having hydrophobic groups as well as functional groups reactive with silanol groups to obtain a hydrophobic polymer;

dispersing said hydrophobic polymer in a dispersing medium to form a resulting gel; and supercritically drying said resulting gel at a temperature and pressure above a critical point of said dispersing medium to obtain a hydrophobic aerogel which has a porous structure, wherein said hydrophobic agent is selected from the group consisting of a carboxylic acid and a halogenated alkyl.

14. A process of forming a hydrophobic aerogel comprising the steps of:

hydrolyzing and condensing, in the presence of water, an alcohol, and an alkoxysilane which is expressed by the following formula:

$$SiR^1n(OR^2)_{4-n}$$

wherein each of $R^1$ and $R^2$ stands for a $C_1$–$C_5$ alkyl group or phenyl group, n is 0–2, to obtain an alcogel having a skeleton structure of $-(SiO_2)-$ and silanol groups;

performing a hydrophobic treatment upon said alcogel with a solution of a hydrophobic agent in a first solvent, thereby forming a hydrophobic alcogel, said hydrophobic agent having hydrophobic groups as well as functional groups reactive with said silanol groups;

replacing said first solvent included in the hydrophobic alcogel with a first alcohol which has a higher critical point than carbon dioxide;

replacing said first alcohol at least partially with carbon dioxide; and supercritically drying the resulting alcogel at a temperature and pressure above a critical point of a mixture of said first alcohol and said carbon dioxide or said carbon dioxide.

15. A process as set forth in claim 14, wherein said first solvent has a higher boiling point than an alcohol.

16. A process as set forth in claim 15, wherein said first solvent is a toluene.

17. A process of forming a hydrophobic aerogel comprising the steps of:

hydrolyzing and condensing, in the presence of water, an alcohol, and an alkoxysilane which is expressed by the following formula:

$$SiR^1_n(OR^2)_{4-n}$$

wherein each of $R^1$ and $R^2$ stands for a $C_1$–$C_5$ alkyl group or phenyl group, n is 0–2, to obtain an alcogel having a skeleton structure of $-(SiO_2)-$ and silanol groups;

performing a hydrophobic treatment upon said alcogel with a solution of a hydrophobic agent in a first solvent, thereby forming a hydrophobic alcogel, said hydrophobic agent having hydrophobic groups as well as functional groups reactive with said silanol groups;

replacing said first solvent included in the hydrophobic alcogel with a first alcohol;

supercritically drying the resulting alcogel at temperature and pressure above a critical point of said first alcohol.

18. The process of claim 13, wherein said carboxylic acid is selected from the group consisting of acetic acid, formic acid and succinic acid.

19. The process of claim 13, wherein said halogenated alkyl is methylchloride.

* * * * *